(12) United States Patent
Ajima et al.

(10) Patent No.: US 6,658,189 B2
(45) Date of Patent: Dec. 2, 2003

(54) BROADBAND AMPLIFIED SPONTANEOUS EMISSION LIGHT SOURCE

(75) Inventors: Hiromi Ajima, Yokohama (JP); Yusuke Takei, Yokohama (JP); Yukiko Furukata, Yokohama (JP); Michitaka Okuta, Yokohama (JP)

(73) Assignee: Kyocera Corporation, Kyoto (JP)

( * ) Notice: Subject to any disclaimer, the term of this patent is extended or adjusted under 35 U.S.C. 154(b) by 100 days.

(21) Appl. No.: 09/828,299

(22) Filed: Apr. 5, 2001

(65) Prior Publication Data

US 2001/0046364 A1 Nov. 29, 2001

(30) Foreign Application Priority Data

May 25, 2000 (JP) ..................... P 2000-154916

(51) Int. Cl.⁷ .................................. G02B 6/02
(52) U.S. Cl. ..................... 385/123; 385/122; 372/6; 359/341.1; 359/341.3
(58) Field of Search .................. 257/98; 359/188, 359/341.1, 341.3; 372/6, 40, 66, 70, 71, 72, 1, 5, 22, 23; 385/123, 122

(56) References Cited

U.S. PATENT DOCUMENTS

| | | | | |
|---|---|---|---|---|
| 4,938,556 A | * | 7/1990 | Digonnet et al. | 359/341.31 |
| 5,191,586 A | * | 3/1993 | Huber | 359/340 |
| 6,011,645 A | * | 1/2000 | Hong | 359/134 |
| 6,507,429 B1 | * | 1/2003 | Ales et al. | 359/341.1 |

OTHER PUBLICATIONS

Derickson et al, Fiber Optic Test and Measurement, 1998, Prentice–Hall, Inc., pp. 522–525.*
Lee et al, Passive erbium–doped fiber seed photon generator for hogh–power Er3+–doped fiber fluorescent sources with an 80–nm bandwidth, Mar. 1, 1999, Optical Society of America, Optics Letters vol. 24 No. 5, pp. 279–281.*
H. Ono, M. Yamada, and Y. Ohishi, Gain–Flattened Er3+–Doped Fiber Amplifier for a WDM Signal in the 1.57–1.60–um Wavelength Region, May 1997, IEEE Photonics Technology Letters, vol. 9 No. 5, pp. 596–598.*

* cited by examiner

Primary Examiner—Audrey Chang
Assistant Examiner—Denise S. Allen
(74) Attorney, Agent, or Firm—Hogan & Hartson

(57) ABSTRACT

A broadband ASE light source is provided which comprises an amplifying optical fiber doped with rare earth; a pumping light source and an output port both which are connected to one end of the amplifying optical fiber via a multiplexer; and a reflecting or circulating member which is connected to the other end of the amplifying optical fiber, whereby the amplifying optical fiber emits ASE light containing a first and second wavelength bands through the port. Particularly, a second pumping light source may be connected to the other end of the amplifying optical fiber via another multiplexer to widen the wavelength band to longer wavelength side. Further, using the amplifying Er-doped optical fiber with the pumping light sources having wavelength of a 980 nm band, the ASE light source can emit a flattened broadband of 1530 to 1610 nm, combining the two wavelength bands of 1530 to 1570 mn and 1570 to 1610 nm. The input power supplied for the amplifying fiber from the second pumping light source may be less than 20% of the input power supplied for the amplifying fiber from the first pumping light source.

26 Claims, 9 Drawing Sheets

*Fig.12*
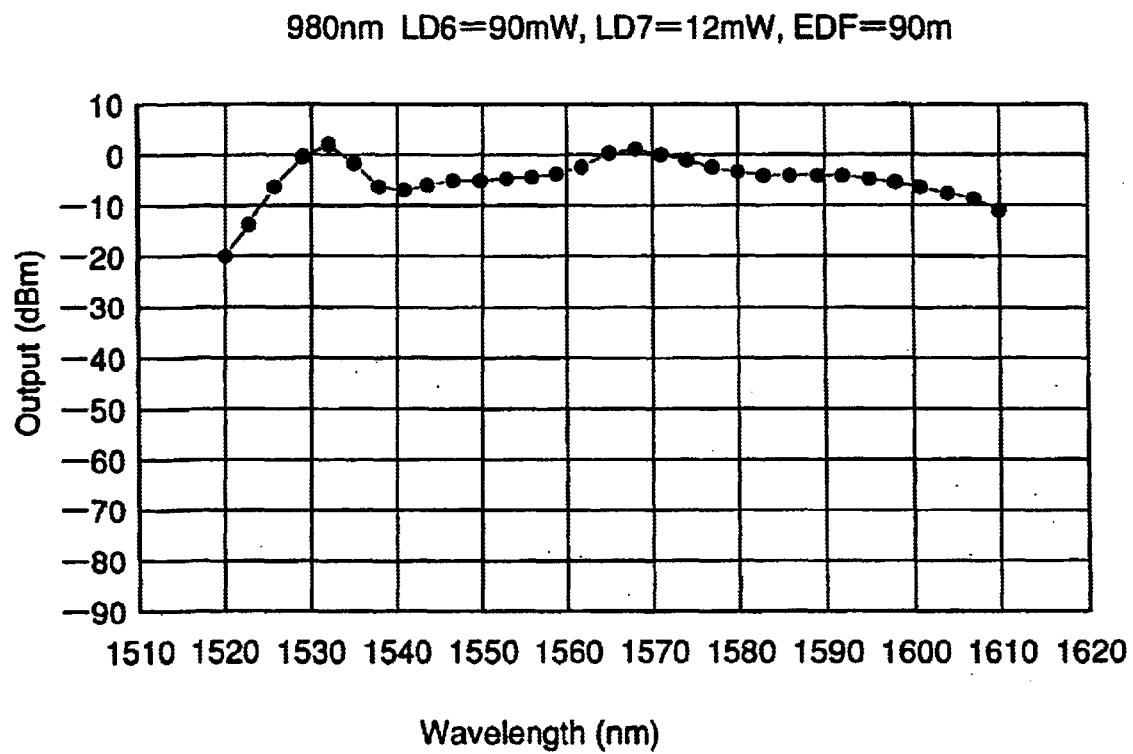
*Fig.13*  Prior Art
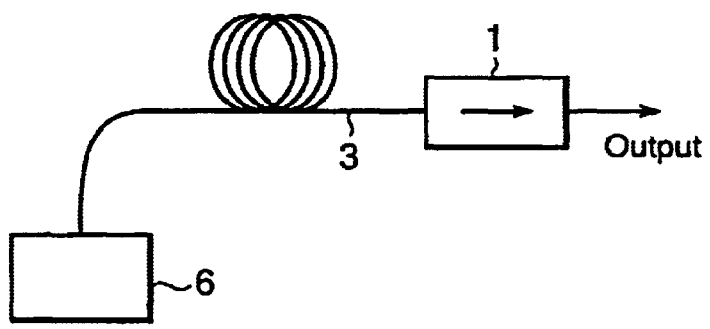

BROADBAND AMPLIFIED SPONTANEOUS EMISSION LIGHT SOURCE

BACKGROUND OF THE INVENTION

Field of the Invention

The present invention relates to an light source to output ASE light by supplying pumping light to an optical amplifying fiber.

An optical fiber doped with rare earth ions emits light in an amplifying signal band when the ion excited to a high energy level by pumping light returns to the stable ground level. The emitted light is referred to as amplified spontaneous emission light (ASE light). ASE light sources are used to emit the ASE light as light sources. For example, such an ASE light source can be used to determine wavelength loss characteristics of an optical device by connecting to the device which is coupled to an optical spectral analyzer or other measuring instrument.

FIG. 13 shows a conventional ASE light source composed of an amplifying rare-earth doped optical fiber 3 such as Er-doped fiber, a pumping source 6, and an optical isolator 1. In this ASE light source, erbium ions doped in the amplifying optical fiber 3 are excited into a high energy level by pumping the light from the pumping source 6, and then, emits ASE light in the wavelength band individual to the ion when the excited energy higher than the ground level is emitted. The isolator 1 prevents the ion excitation in the amplifier fiber from being made unstable by the returning light from the output end of the fiber While the emitted ASE light from Er-doped amplifying fiber amplifier typically includes a wavelength band of 1530 to 1570 nm (1550 nm band), the fiber can emit a wavelength band of 1570 to 1610 nm as the fiber length is elongated 4 to 6 times as long as the usual fiber length. See Ono et al; "Amplifying Characteristics of 1.58 μm Band $Er^{3+}$-Doped Optical Fibers Amplifier", Technical Report of Institute Of Electronics, Information and Communication Engineers, Japan, No. 5, pp 25–29, 1997.

In addition, 36 nm of a half-width of the ASE light has been achieved by a quartz Er-doped fiber (in a range of 1567 to 1604 nm), and 40 nm (1563 to 1603 nm) by a fluoride Er-doped fiber.

FIG. 14 shows the determined wavelength distribution of ASE power from the Er-doped fiber 3 with a variable fiber length. The data were determined at a pumping wavelength of 1480 nm (the 1480 nm pumping having a higher pumping efficiency with respect to amplified spontaneous emission than the 980 nm pumping), with pumping power of 100 mW, and fiber lengths varied between 20 m and 150 m. It has been seen from FIG. 14 that the length of the fiber shifts the amplified wavelengths from the 1550 nm band to the 1580 nm band, while an excessive length of the fiber lowers the output power from the ASE light sources.

Also, it in known that an Er doped tellurite fiber provides a signal amplifying performance in a broader band, for example, in a range of 1530 to 1610 nm, than conventional. See M. Yamada et al; "Low -Noise Gain-Flattened $Er^{3+}$ Doped Tellurite Fiber Amplifier", optical Amplifiers and Their Applications, 1998, Technical Digest, pp 86–89 (1998), Optical Society of America. According to the above, tellurite fibers which are formed by doping erbium in tellurite glass fibers, because of relatively low reliability to moisture, must, in use, be sealed perfectly with particular air-tight packages in order that the tellurite fiber amplifiers may be applied to generally optical communication systems.

Recently, in addition to the present 1530–1570 nm communication band, available wavelength bands in optical communication have been expanded to a 1570 –1610 nm band in order to greatly increase communication capacity. Then, communication devices to be used in the widened wavelength band are required to have good operations in longer wavelengths over the 1530–1570 nm band, and at the same time, broadband ASE light sources for testing the broadband communication devices are required to provide coverage of such a broader band.

However, the conventional single light source with ASE using quartz- or fluoride-based fibers can emit either the 1530–1570 nm band (1550 nm band) or the 1570–1610 nm band (1580 nm band) on the practical base, but no single ASE source for emitting both bands with flattened light levels has been developed. Two ASE light sources to emit each different band, 1550 nm band and 1580 nm band, can be mixed into a single fiber, but the application of two ASE sources and a multiplexer for mixing the two sources is costly and disadvantageous.

It could be considered that the tellurite-based ASE source noted above was used to spread the emitting light band, but it was difficult to deal with the tellurite-fiber for practical usage. Also, the tellurite-based ASE source can emit at the 1580 nm band the power only lower than a tenth times as high as at the 1550 nm band, and therefore, high power pumping light is required to increase the output power of the 1580 nm band.

SUMMARY OF THE INVENTION

Aspects of the present invention can provide an ASE light source being capable of emitting high power broadband light by using a low pumping power with low cost.

Aspects of the present invention can provide an ASE light source, particularly, using amplifying Er-doped fiber to spread the flattened emitting band to 1550 nm and 1580 nm bands with a low pumping light power.

A broadband ASE light source includes: an amplifying optical fiber doped with rare earth; a pumping light source and an output port both which are coupled to one end of the amplifying optical fiber via a multiplexer; and a reflecting or circulating member which is coupled to the other end of the amplifying optical fiber.

Preferably, the amplifying optical fiber may have so large a length as to provide amplified spontaneous emission (ASE) light having a broad wavelength band containing a first and second wavelength bands individual to the doped ions through the port.

The reflecting or circulating member in the ASE light source can reflect or circulate light from the amplifying fiber to return into the same amplifying fiber, and then increase and/or flatten the amplitude over the broad wavelength band.

The broadband ASE light source may further include a second pumping source which is connected to the other end of the amplifying optical fiber along with the reflecting or circulating member. In this ASE light source, the previous (i.e., first) pumping source and the second pumping source supply pumping light for the one end and the other end, respectively, of the amplifying optical fiber, to emit the broadband ASE light including a first and second wavelength bands wherein the second pumping light source compensates for the potentially low level of the first band to increase.

Further, the broadband ASE light source may include only the one pumping light source which supplies its pumping light for both ends of the amplifying optical fiber. In this type, a distributing member may be coupled between the pumping light source and both ends of the amplifying optical fiber via respective multiplexers in order to divide the pumping light for the one end and the other end of the amplifying optical fiber (i.e., for the one end of the amplifying fiber along with the output port, and for the other end of the same along with the reflecting or circulating member).

Particularly, the amplifying optical fiber may include an erbium-doped optical fiber. The amplifying optical fiber may be based on silica or fluoride.

By using an Er-doped optical fiber, the ASE light source amplifying can emit broadband light in a flattened spectral range of 1530 to 1610 nm, composed of the 1550 nm band (1530–1570 nm) and the 1580 nm band (1570–1610 nm), both wavelength bands individual in stimulated emission light of Er ions.

The broadband ASE light sources can be used as broadband light sources for detecting spectrum characteristics of optical devices, particularly, optical communication systems, for using wavelength division multiplexer (WDM) transmission techniques in the above broadband wavelength.

BRIEF DESCRIPTION OF THE DRAWINGS

The present invention is explained below in further detail with reference to the accompanying drawings, in which:

FIG. 12 shows a typical spectral diagram of output light from the ASE light source according to another embodiment of the present invention;

FIG. 13 shows a conventional ASE light source; and

DETAILED DESCRIPTION OF THE INVENTION

Aspects of the present invention can provide amplifying optical fibers made of silica or fluoride and doped with Erbium (ER) as rare earth metal. Particularly, silica-based Er-doped optical fibers are less expensive as compared with tellurite fibers.

Figure 1:
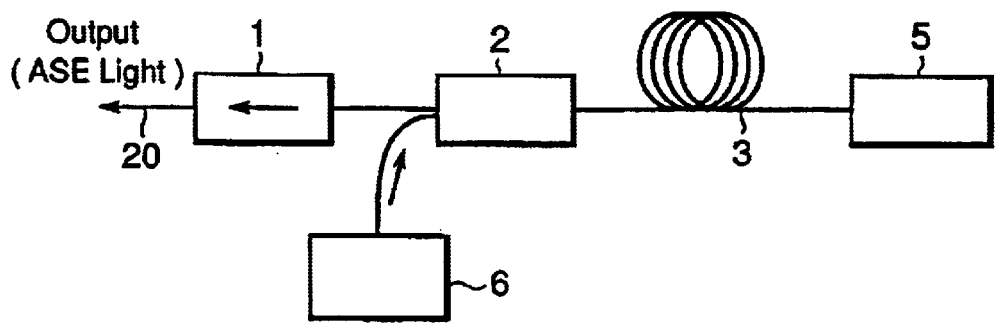
FIG. 1 shows an arrangement of an ASE light source according to an embodiment of the present invention.

In a first embodiment of the invention, the amplifying optical fiber 3, as shown in FIG. 1, is connected at one end to both a pumping light source 6 and an isolator 1 via an optical coupler 2, the isolator 1 being connected to an output port 20. The other end of the amplifying optical fiber 3 is connected to a reflecting member 5.

In the case of the amplifying Er-doped optical fiber 3, the pumping light source 6 may be a semiconductor laser oscillator, such as a laser diode emitting a 1480 nm band or 980 nm hand, to radiate the output wavelength light from the amplifying optical fiber. The pumping light from the pumping light source 6 is introduced through the optical coupler 2 into the amplifying Er-doped optical fiber 3.

The isolator 1 is used to reduce and/or eliminate the light returning from the output port side to the amplifying fiber again, using, for example, a Faraday rotator.

The optical coupler 2 may be an optical fiber coupler which is composed of two transferring fibers which are connected with a fused and elongated portion attached side by side to a part of the amplifying optical fiber 3. The two transferring fibers are connected to the pumping light source 6 and the isolator 1.

On the other hand, the reflecting member 5 provided at the other end of the fiber way include a full-reflecting mirror that can include, for example, a dielectric multilayer which is attached to an end surface of said other end of the amplifying optical fiber 3, to reflect the light from the amplifying optical fiber to said fiber again. A full-reflecting mirror may be a mirror composed of a high-reflectance metallic film vapor —deposited on the end plane or the other end of the amplifying optical fiber. In place of the reflecting member 5, a circulating member may be used, as will be described below, having the same function of reflecting the light in the amplifying optical fiber as a reflecting member.

In the ASE light source of this embodiment, when pumping light from the pumping light source 6 is introduced into the amplifying optical fiber 3, the pumping light excites Er ions present in the fiber 3, and then the stimulated ions amplify spontaneously and emit light of a 1550 nm wavelength band. A part of the emitted light 1550 nm band in the fiber 3 is, through the isolator 1, outputted from the output port 20, but another part of the emitted 1550 nn band light transfers in the rear part of said fiber 5 toward the reflector and is absorbed by and excites the erbium (Er) ions therein where the excited ions amplify spontaneously and emit 1580 nm band light in the amplifying optical fiber 3. The 1580 nm band light advances directly, or is reflected at the reflector 5 and returned, to the isolator 1, and then is output from the output port 20. Thus, the first band including 1550 nm band and the second band including 1580 nm band due to the doped erbium ions are combined into a flattened wavelength broadband of 1530 to 1610 nm which is emitted from the ASE source.

For amplifying Er-doped optical fibers to amplify 1580 nm band stably and effectively along with the 1550 nm band, the amplifying optical fibers are required to have enough large length dependently on an erbium doped ion concentration. For this purpose, it is preferable to set a high product of length of an amplifying optical fiber multiplied by a concentration of erbium (Er) doped in the fiber material of the amplifying optical fiber. For the amplifying Er-doped optical fiber, the length-concentration product may be set to be higher than 50,000 m·ppm. In the optical fibers, Er may be doped with about 100–1200 ppm by weight, preferably, for example, 300–600 ppm by weight, of a content of erbium, particularly, about 450 ppm by weight which is available commercially, and in these cases, the length of said fiber may be greater than 50 m, preferably greater than 100 m.

As Example 1 of this embodiment, experiments were conducted using ASE light sources in which silica-based Er-doped optical fibers 3 with length varying in a range of 100 to 130 m were used as an amplifying Er-doped optical fiber, and a pumping light source 6 was introduced into the fiber 3, with constant power of 100 mW at a wavelength of 1480 nm of a laser diode. A reflector 5 was used with reflectance over 90%.

Figure 2:
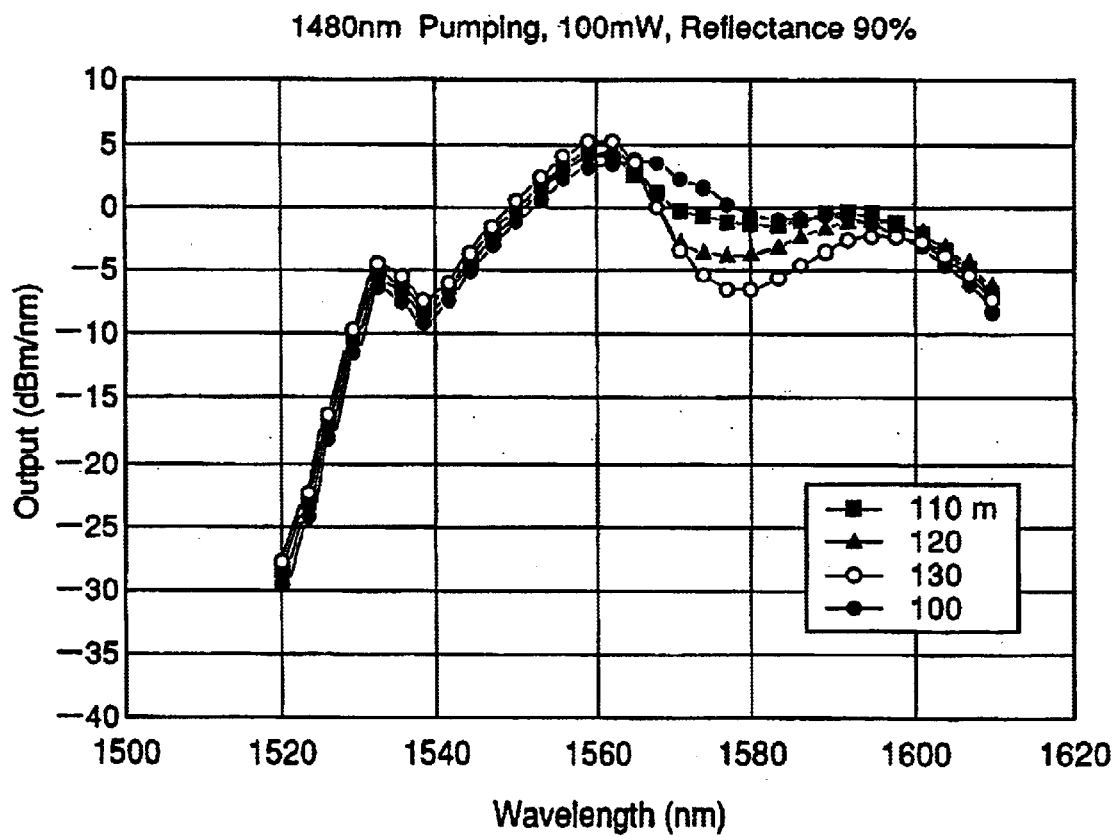
FIG. 2 shows a spectral diagram of the output light power from the ASE light source using 1480 nm band pumping light, shown FIG. 1, with a parameter of length of an amplifying optical fiber.
Figure 3:
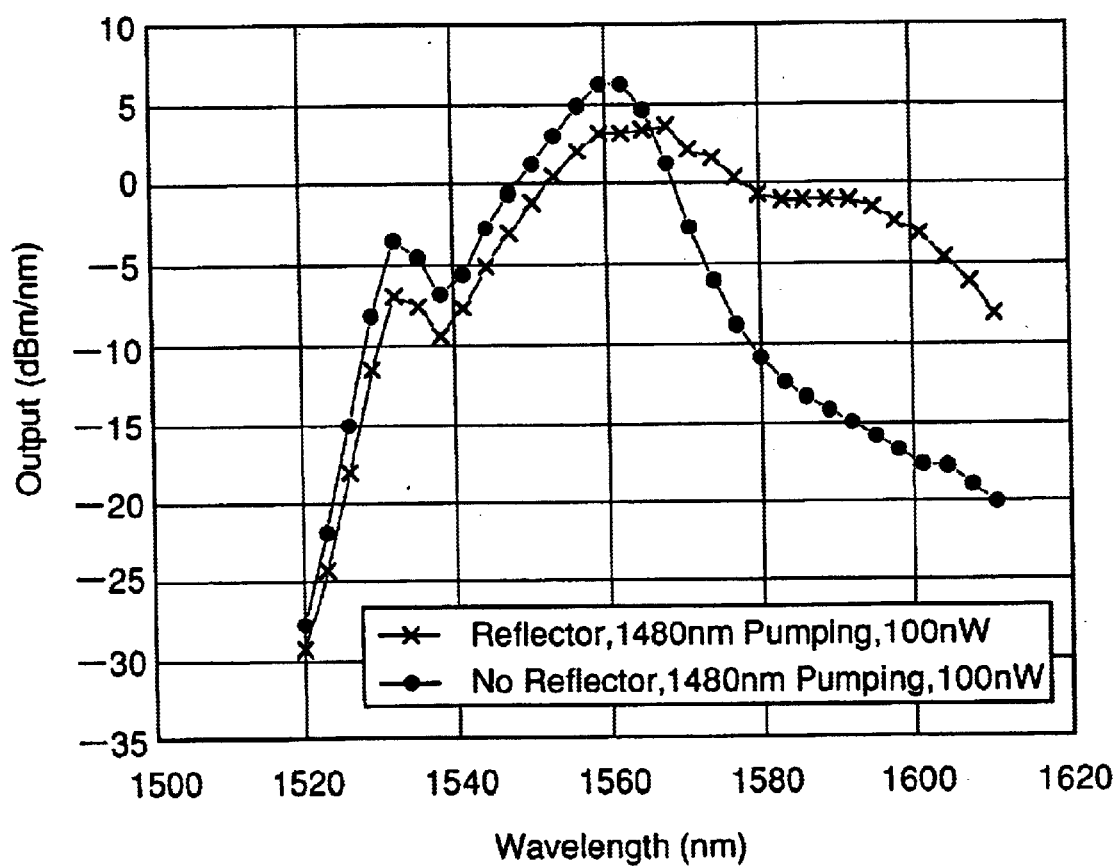
FIG. 3 shows a spectral diagram of the output light power from the ASE light for comparison of the presence and the absence of a reflector.

The spectral distribution of emitted light from the ASE was determined and the result is shown in FIG. 2. It is seen from this figure that the amplifying optical fiber having the length of about 100 m exhibits a relatively flattened spectrum of the emitted light with high power in the broad band of 1530 to 1610 nm. An increase in pumping power further increases the ASE light power though a high pumping light source will be expensive, then, not always preferable, FIG. 3 shows a spectral diagram of the output light from the ASE light source conducted in a similar manner to the above experiments, except using no reflector. It is found that application of a reflector to the end of an amplifying optical fiber is very effective in expanding the spectrum of the output light toward longer wavelength.

Figure 4:
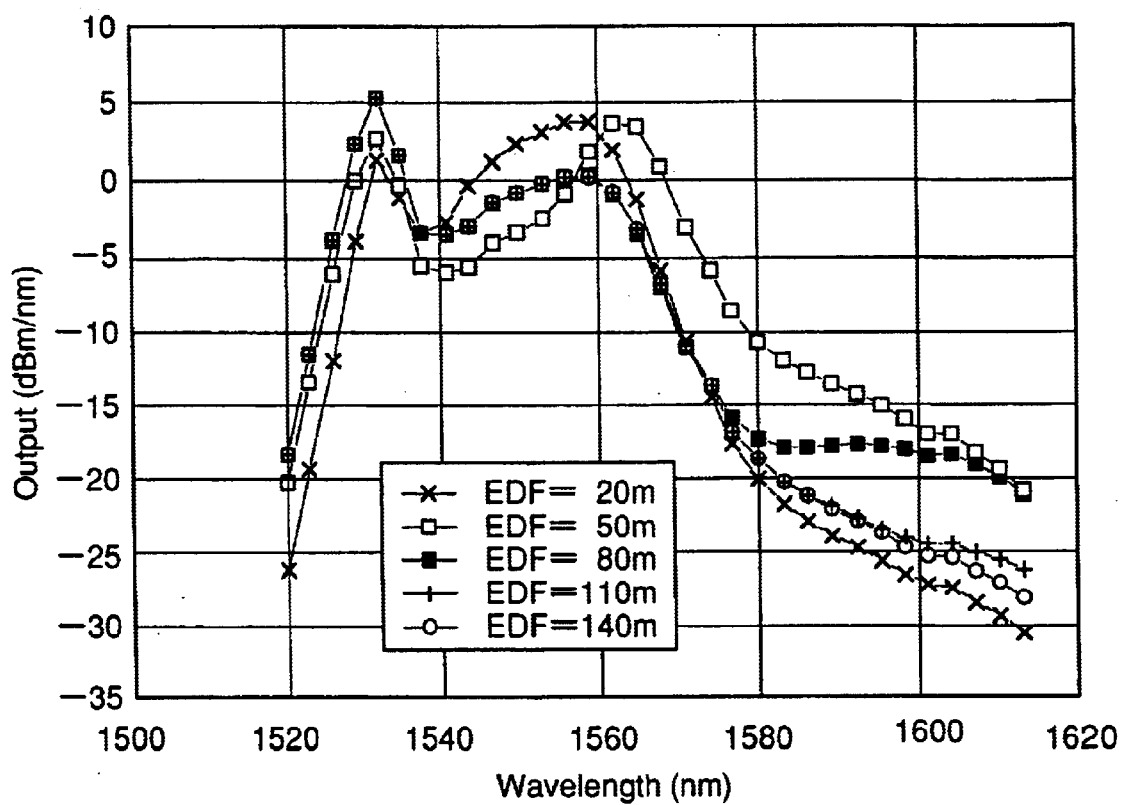
FIG. 4 shows a spectral diagram with 980 nm band pumping, similarly to FIG. 2.

FIG. 4 shows a spectral diagram of the output light from the ASE conducted in a similar manner to the above experiment except that the wavelength 980 nm of the pumping light was used in place of the 1480 nm pumping light. In this case, the ASE light power is insufficient at the wavelengths over 1570 nm, as compared with the 1480 nm pumping light, even when the amplifying optical fiber is over 100 m long.

Figure 5:
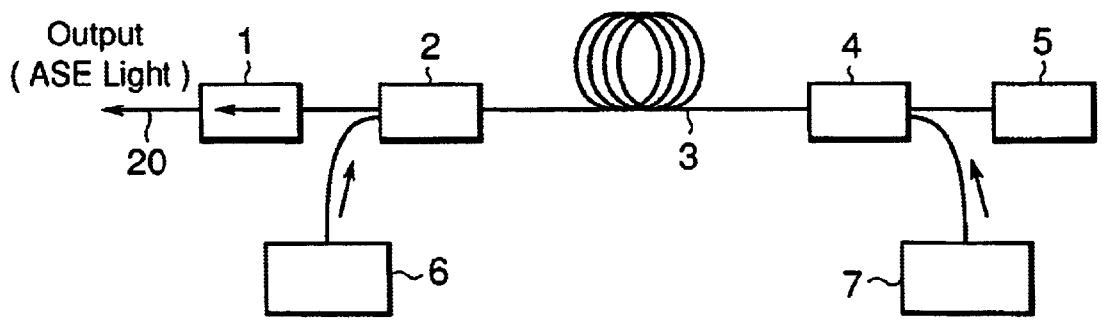
FIG. 5 shows an ASE light source using two pumping light sources for bidirectional pumping, according to another embodiment of the present invention.

In a second embodiment of the present invention, an ASE light source uses two pumping light sources which connect both ends of an amplifying Er-doped optical fiber, as described below. The ASE light source of this embodiment, as shown in FIG. 5, is composed of: an amplifying Er-doped optical fiber 3; a first pumping light source 6 and an optical isolator 1 both which are connected to one end of the fiber 3 via first optical coupler (i.e., multiplexer ) 2; a reflector 5 as a reflecting member and a second pumping light source 7 both which are connected to the other end of the fiber 3 via a second optical coupler (i.e., multiplexer) 4; and an output port 20 connected to the isolator 1 to emit output light.

In this second embodiment, the erbium doped optical fiber may have length in a range of 50 to 140 m, which is 5 to 7 times as long as conventional fiber length of 10 to 20 m, and such a long fiber is useful to emit the longer 1580 nm band light.

In the process of emitting light from the amplifying Er-doped optical fiber 3, when pumping light from the first pumping light source 6 is induced into the fiber 3 via the multiplexer 2, the 1550 nm band light is emitted in all of the fiber 3 and then a part of light is outputted through the isolator 1, as described above in the first embodiment. This band of the light is damped while being absorbed in the transferring process through the fiber 3 toward the reflector 5, and 1580 nm band ASE light is increasingly amplified during transferring in all the fiber 3. The fiber 3 is needed to be set to be 50 to 140 m or longer. The emitted 1580 nm band light is reflected by the reflector 5, amplified within the fiber, and emitted from the output port though the isolator 1. However, the intensity of the 1580 nm band light is less than several percents of that of the 1550 nm band light.

In this embodiment, particularly, the second pumping source 7 is prepared to enter its pumping light into another end of the fiber 3, allowing the introduced pumping light to further amplify the 1580 nm band ASE light emitted due to the first pumping light source 6 and at the same time to amplify the 1550 nm band light. As a result, emission of almost evenly leveled intensities of both 1550 nm and 1580 nm bands are obtained from the output port 20. The light power of the second pumping light source 7 may be 20% or less, or preferably about 10% of that of the first pumping light source 6.

Figure 6:
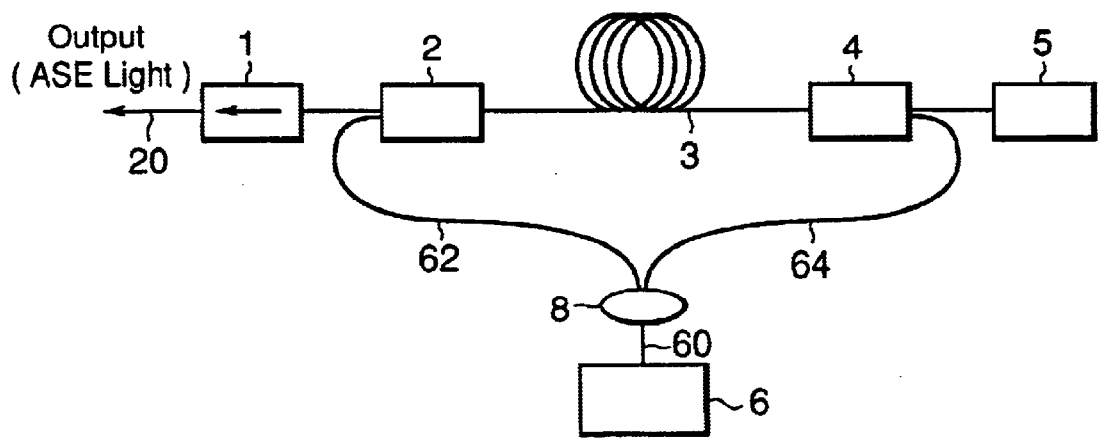
FIG. 6 shows an ASE light source using a common pumping light sources for bidirectional pumping according to another embodiment of the present invention.

In a third embodiment of the invention, as sown in FIG. 6, only one pumping source 6 may be provided for an ASE light source. The ASE light source of this embodiment is composed of: an amplifying Er-doped optical fiber 3; an pumping light source which is introduced, by passing through a distributor 8 via a light passage 60, to one end and the other end of the amplifying Er-doped optical fiber 3, via a first optical coupler 2 and a second optical coupler 4, respectively; an optical isolator 1 which is connected to the one end of the fiber 3 via the first optical coupler (e.g., multiplexer) 2; a reflector 5 as a reflecting member which is connected to the other end of the fiber 3 via the second optical coupler (e.g., multiplexer) 4; and an output port 20 connected to the isolator 1 to emit output light.

In this third embodiment, the erbium doped optical fiber may also have length in a range of 50 to 140 m, which is 5 to 7 times as long as conventional fiber length of 10 to 20 m, and such a long fiber is useful to emit the longer 1580 nm band light. The output light of only one pumping source 6 is divided by means of a distributor 8 into two light passages 62 and 64, the one passage 62 being transferred to a first optical coupler 2 of the one end of the amplifying Er-doped optical fiber 3, and the other passage 64 being transferred to the optical coupler 4 of the other end of said fiber 3. In this case, also, the functions of the pumping light induced to the one and the other ends of the fiber may be performed in the same manner as the second embodiment above.

This embodiment is advantageous to be made the ASE light source more inexpensive and compact by using only one pumping source. By adjusting a distribution ratio of the two light intensities of the distributor 8, the power ratio of the two pumping beams introduced into both ends of the fiber 3 can be easily controlled to obtain even, flattened power distribution of the two bands to be emitted from the output port.

Figure 7:
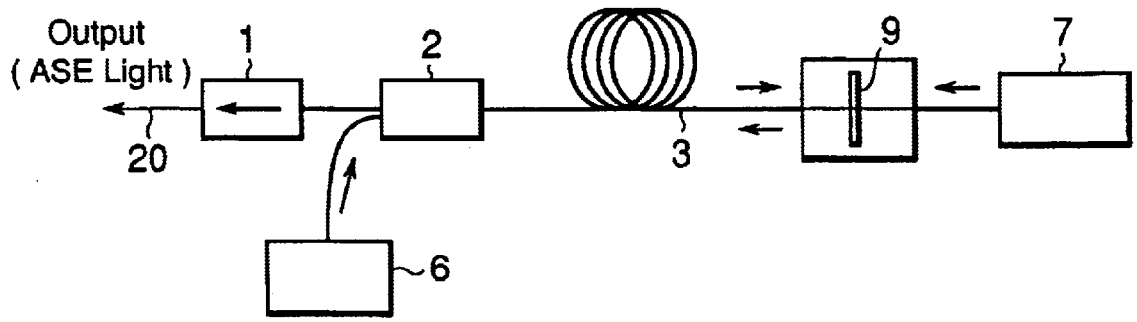
FIG. 7 shows an ASE light source using a filter type mirror according to another embodiment of the present invention.

In a fourth embodiment of the present invention, a filter module 9 may be used for the ASE light source, as shown in FIG. 7, for incorporating a optical coupler, i.e., multiplexer 4 in the rear part of the fiber 3 with a reflector 5 which have described in the second embodiment and shown in FIG. 5. In this case, a filter type reflector 9 is connected between the second pumping source 7 and the amplifying Er-based optical fiber 3, omitting a multiplexer 4. The filter type reflector 9 has functions of reflecting ASE light of above 1550 and 1580 nm bands which is amplified through the amplifying Er-based optical fiber 3 and transferred to the output port 20, and of permitting the pumping light of 980 or 1480 nm band from the second pumping light source 7 to be introduced to said fiber 3. The substitution of the filter type reflector 9 can reduce the number of the parts for making up the ASE source. Such a reflector may be formed of a fiber Bragg grating.

In the invention, in place of reflecting members, circulating members may be used to return the ASE light along a closed fiber circuit.

Figure 8:
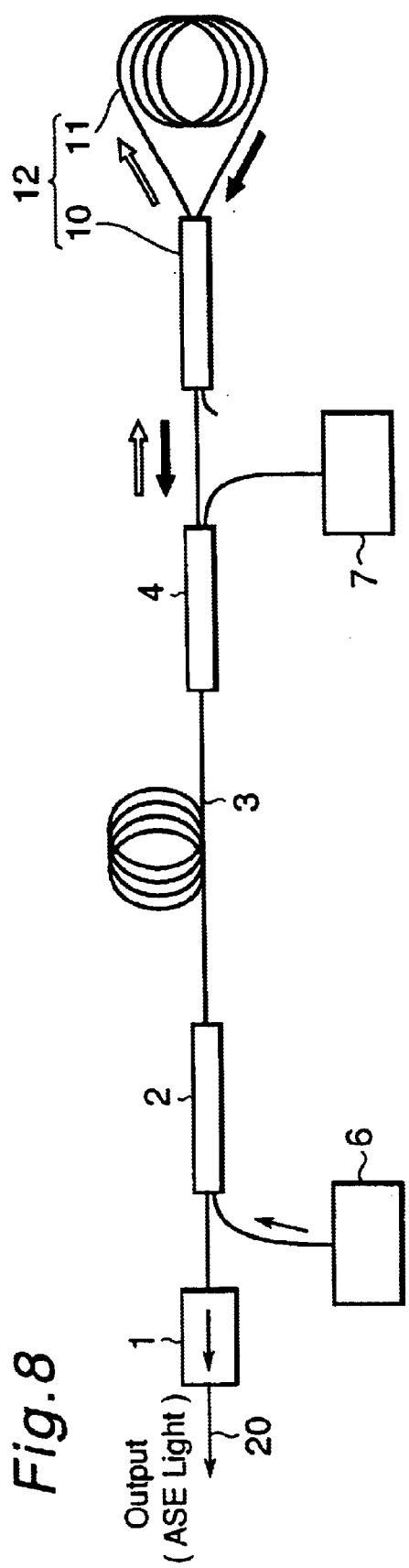
FIG. 8 shows an ASE light source using a circulating member according to another embodiment of the present invention.

In a fifth embodiment of the invention, a circulating member includes a looped fiber 11 and a fiber coupler 10 connecting the amplifying optical fiber 3 to the looped fiber 11 as shown in FIG. 8. In the figure, both ends of the looped fiber 11 is connected to the two divided end fibers of the coupler 10 which has a dividing power ratio of about 1 to 1 between the two and fibers. The opposite end of the coupler 10 is connected to the amplifying optical fiber 3.

In this embodiment, the ASE light from the amplifying optical fiber 3, when reaching the circulating member 12, is divided by the fiber coupler 10 into two beams in the opposite directions to each other, each beam circulating along the looped fiber, and again mixed to the fiber coupler 10 to return back Into the amplifying optical fiber 3. Propagating lengths of the two opposite light beams along which each beam passes through the looped fiber 11 are substantially equal so that the phases of the beams are shifted equally during the circulation. These beams enter into the fiber coupler 10 having the 1:1 distribution ratio and, if the phases of the multiplexed beams in the fiber coupler 10 are inverse phases, then the beams are fully reflected to the same phase side, i.e., exhibiting the same effect as the light from the fiber 3 is reflected by a mirror at an end of the fiber coupler 10.

The circulating member may be fabricated by connecting an end of an fiber coupler 10 to the end of the multiplexer 4, and then connecting by fusing the other two ends, on an opposite side to said end, of the fiber coupler 10 with both corresponding ends of an optical fiber to make a fiber loop. In another fabricating method, an optical fiber which is a part of the multiplexer 4 is connected, by fusing its end portion, to the optical fiber, then, composing a fiber coupler 10.

Such a circulating member 12 may advantageously be used to fabricate the light source at lower cost compared with use of a mirror.

In any embodiments above, quartz and fluoride optical fibers, for example, may be used as an Er-doped fiber 3 to fabricate ASE light sources. Either type of fiber will provide sufficient output power.

The above embodiments show that optical couplers 2 and 4 are fabricated by fusing and elongating two single-mode optical fibers one of which is connected to an Er-doped optical fiber at the ends abutted.

In another method of fabricating an ASE light source, both end portions of an Er-doped optical fiber 3 may be fused partially along with, another respective single mode fiber having a similar propagation constant to the Er-doped fiber and the partially fused portions are elongated, then forming the two multiplexers 4 incorporated with both the end sides of the Er-doped fiber. This method is useful to reduce the number of splicing portions of optical fibers.

Figure 9:
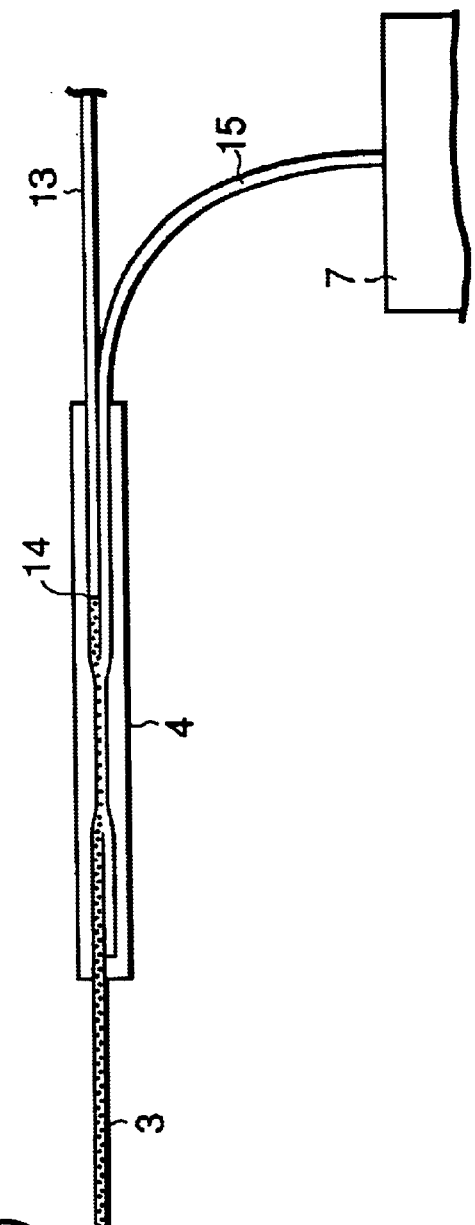
FIG. 9 shows an optical coupler for the ASE light source according another embodiment of the invention.

FIG. 9 shows an example of a multiplexer 4, in which an Er-doped optical fiber 3 is connected, by abutting and fused, to a single mode optical fiber 13 for a reflector 5 or circulator 12 at a connecting point 14 and the Er-doped optical fiber 3 is partially fused and elongated with a single mode optical fiber 15 of the second pumping light source 7, excluding some range of 10 to 15 mm long of the Er-doped fiber from the connected point 14. According to this method, the multiplexer 4 and the connected point 14 may be made so compact as to be packaged integrally in a small case.

Further, in the example in shown in FIG. 8, both the multiplexer 4 and a fiber coupler 10 for a circulating member may be composed of an continuous Er-doped fiber.

As Example 2, ASE light sources were fabricated according to the second embodiment of this invention as described above and shown in FIG. 5, and tested to measure output powers from the ASE light source.

Figure 10:
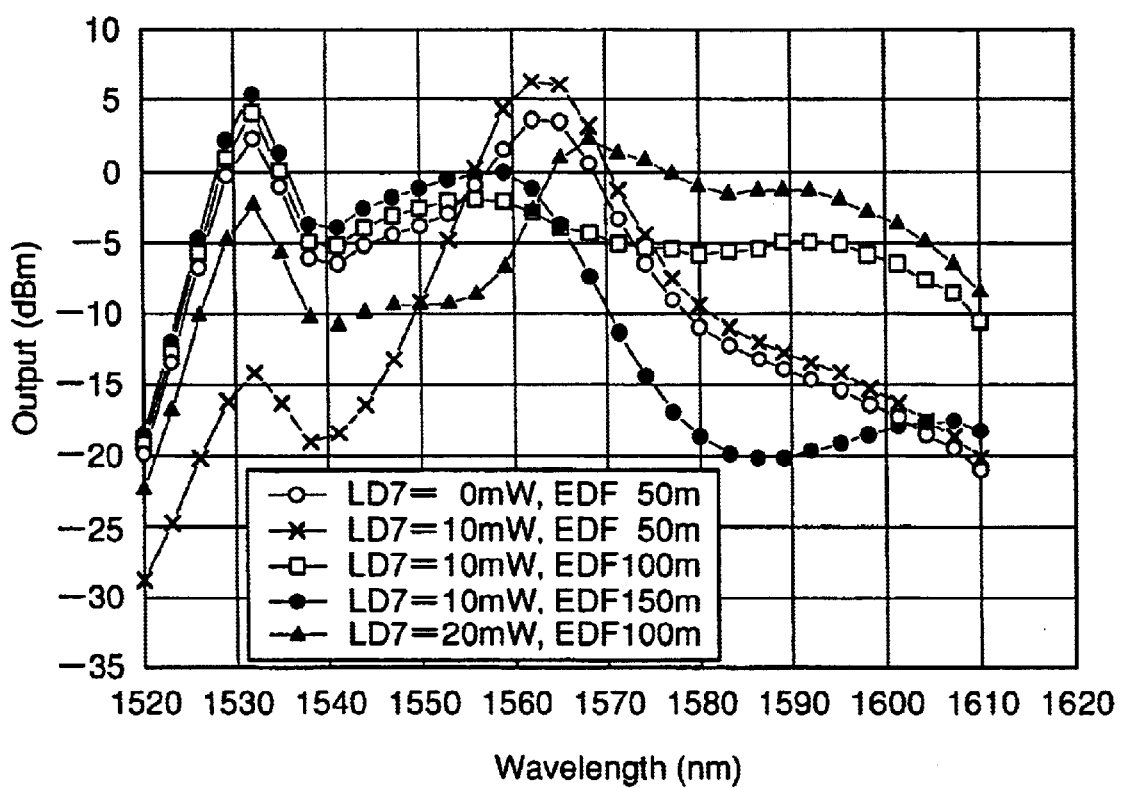
FIG. 10 shows a spectral diagram of output light from the ASE light source according to another embodiment of the present invention.

A first pumping source 6 (LD6) and another pumping source 7 (LD7) were used to emit, respectively, laser power of 100 mw constant and 0–20 mw variable of 980 nm wavelength light. As an Er-doped fiber, a commercially available silica-based Er-doped optical fiber was used with its fiber length changeable in ranges of 50 to 200 m. The used reflector 5 had a reflecting ratio of 90%. FIG. 10 shows the measured power spectrum from the ASE light sources as a function of wavelengths. It is found from FIG. 10 that the condition of 10 mW of power supplied from the second pumping source 7 and a fiber length of 100 m of the Er-doped fiber provides a well flattened broadband power of the ASE light source. In this case, though an increase in both or any of pumping powers may increase the output power of ASE light source, it is not preferable to make the pumping power higher than necessary power for the applications, since the pumping laser oscillators are expensive.

Figure 11:
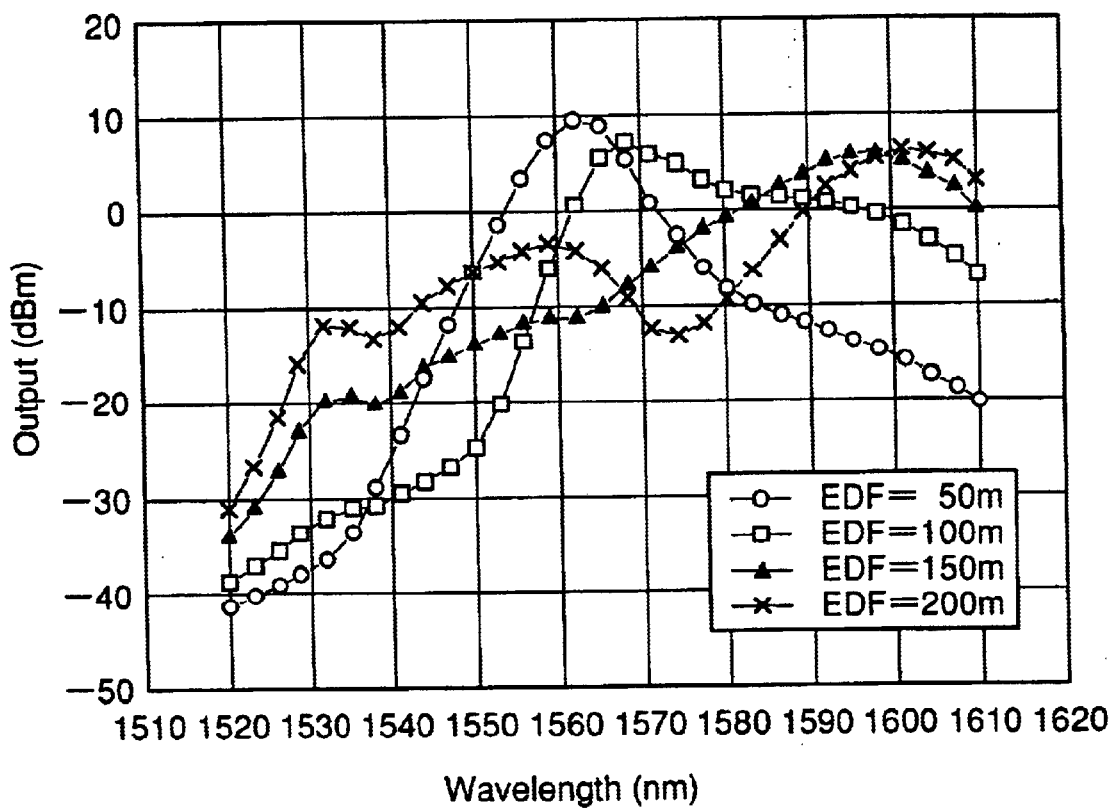
FIG. 11 shows a spectral diagram of output light from the ASE light source according to another embodiment of the present invention.
Figure 14:
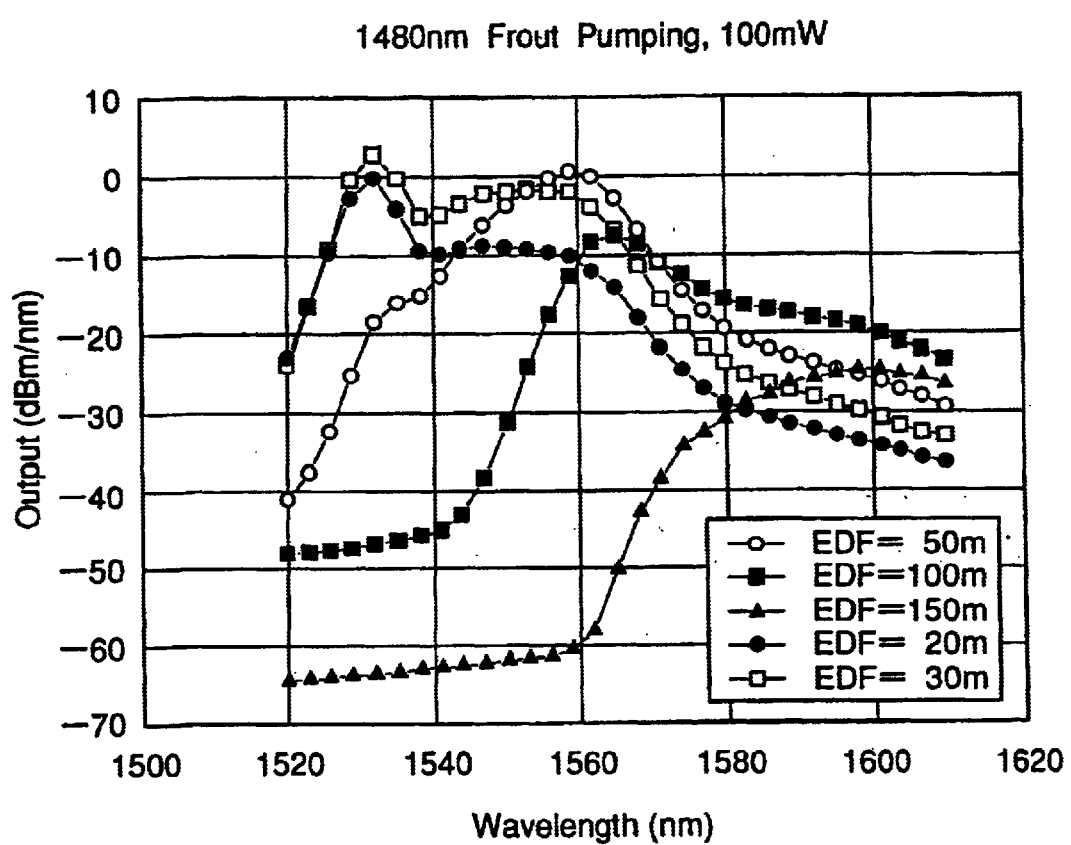
FIG. 14 shows a spectral diagram of output power from the conventional ASE light source shown in FIG. 13.

ASE light sources were tested with the pumping wavelength changed to 1480 nm. The result is shown in FIG. 11. It is seen that as the Er-doped fiber is made long, the wavelength of light from ASE light source is shifted from the 1550 nm band to the 1580 nm band with difficulty to flatten the broader band including both the 1550 and 1580 nm bands.

FIG. 12 shows a typical distribution of the power spectrum obtained from the improved ASE light source under the conditions of an silica-based Er-doped optical fiber (EDF) having a length of 90 m which is supplied with 980 nm wave length in the pumping power of 90 mW from the first pumping light source 6 (LD6) and 12 mW from the second pumping light source 7 (LD7).

What is claimed is:

1. A broadband Amplified Spontaneous Emission (ASE) light source, comprising:
    a single amplifying optical fiber doped with erbium, wherein the fiber has a length in which an ASE light generated at one end of the fiber has a first wavelength band that is converted into a second wavelength band while the ASE light propagates to another end of the fiber;
    a single pumping light source and an output port both which are connected to one end of the amplifying optical fiber via a multiplexer; and
    a reflecting member which is connected to the other end of the amplifying optical fiber, whereby the amplifying optical fiber emits ASE light containing a first wavelength band and a second wavelength band through the port,
    wherein the first wavelength band includes 1530 to 1570 nm of wavelength,
    wherein the second wavelength band includes 1570 to 1610 nm of wavelength, and
    wherein the ASE light includes a band of 1530 to 1610 nm wavelength.

2. The broadband ASE light source according to claim 1 wherein the amplifying optical fiber is a quartz-based optical fiber doped with erbium, and has a length of 50 m or more.

3. The broadband ASE light source according to claim 1 further comprising:
    a distributing member connected between the pumping light source and the one end of the amplifying optical fiber and the divided light from the distributing member is connected to said other end of the amplifying optical fiber via another multiplexer.

4. The broadband ASE light source according to claim 1, wherein the reflecting member is a filter capable of reflecting the ASE light and passing the pumping light through.

5. The broadband ASE light source according to claim 1, wherein the amplifying optical fiber is a fluoride-based optical fiber doped with erbium, and has a length of 50 m or more.

6. The broadband ASE light source according to claim 1, wherein a product of length and erbium weight concentration of the amplifying optical fiber is greater than 15,000 m·ppm.

7. A broadband Amplified Spontaneous Emission (ASE) light source, comprising:
    a single amplifying optical fiber doped with erbium, wherein the fiber has a length in which an ASE light generated at one end of the fiber has a first wavelength band that is converted into a second wavelength band while the ASE light propagates to another end of the fiber;
    a first pumping light source and an output port both which are connected to one end of the amplifying optical fiber via a multiplexer;
    a second pumping light source connected to the other end of the amplifying optical fiber via another multiplexer; and
    a reflecting member which is connected to the other end of the amplifying optical fiber, whereby the amplifying optical fiber emits ASE light containing a first wavelength band and a second wavelength band through the port;
    wherein the first wavelength band includes 1530 to 1570 nm of wavelength,
    wherein the second wavelength band includes 1570 to 1610 nm of wavelength, and
    wherein the ASE light includes a band of 1530 to 1610 nm wavelength.

8. The broadband ASE light source according to claim 7 wherein both the pumping light sources have wavelength of a 980 nm band, and the input power supplied for the amplifying fiber from the second pumping light source is less than 20% of the input power supplied for the amplifying fiber from the first pumping light source.

9. A broadband Amplified Spontaneous Emission (ASE) light source, comprising:
    a single amplifying optical fiber doped with erbium, wherein the fiber has a length in which an ASE light generated at one end of the fiber has a first wavelength band that is converted into a second wavelength band while the ASE light propagates to another end of the fiber;
    a single pumping light source and an output port both which are connected to one end of the amplifying optical fiber via a multiplexer; and
    a circulating member connected to the other end of the amplifying optical fiber, whereby the amplifying optical fiber emits ASE light containing a first wavelength band and a second wavelength band through the port, wherein the first wavelength band includes 1530 to 1570 nm of wavelength, the second wavelength band includes 1570 to 1610 nm of wavelength, and the ASE light includes a band of 1530 to 1610 nm wavelength.

10. The broadband ASE light source according to claim 9, wherein the circulating member comprises a fiber coupler connected to the amplifying optical fiber and a looped optical fiber whose both ends are connected to the fiber coupler.

11. The broadband ASE light source according to claim 9, wherein the amplifying optical fiber has a length greater than 50 m and less than approximately 140 m.

12. The broadband ASE light source according to claim 9, wherein the amplifying optical fiber is a quartz-based optical fiber doped with erbium, and has a length of 50 m or more.

13. The broadband ASE light source according to claim 9, wherein the amplifying optical fiber is a fluoride-based optical fiber doped with erbium, and has a length of 50 m or more.

14. The broadband ASE light source according to claim 9, further comprising:
    a distributing member is connected between the first pumping light source and the one end of the amplifying optical fiber and the divided light from the distributing member is connected to said other end of the amplifying optical fiber via another multiplexer.

15. The broadband ASE light source according to claim 9, wherein a product of length and erbium weight concentration of the amplifying optical fiber is greater than 15,000 m·ppm.

16. A broadband Amplified Spontaneous Emission (ASE) light source, comprising:
    a single amplifying optical fiber doped with erbium, wherein the fiber has a length in which an ASE light generated at one end of the fiber has a first wavelength band that is convered into a second wavelength band while the ASE light propagates to another end of the fiber;
    a first pumping light source and an output port both which are connected to one end of the amplifying optical fiber via a multiplexer:
    a second pumping light source connected to the other end of the amplifying optical fiber via another multiplexer; and
    a circulating member connected to the other end of the amplifying optical fiber, whereby the amplifying optical fiber emits ASE light containing a first wavelength band and a second wavelength band through the port, wherein the first wavelength band includes 1530 to 1570 nm of wavelength, the second wavelength band includes 1570 to 1610 nm of wavelength, and the ASE light includes a band of 1530 to 1610 nm wavelength.

17. The broadband ASE light source according to claim 16, wherein both the pumping light sources have wavelength of a 980 nm band, and the input power supplied for the amplifying fiber from the second pumping light source is less than 20% of the input power supplied for the amplifying fiber from the first pumping light source.

18. The broadband ASE light source according to claim 17, wherein the circulating member comprises a fiber coupler connected to the amplifying optical fiber and a looped optical fiber whose both ends are connected to the fiber coupler.

19. A broadband Amplified Spontaneous Emission (ASE) light source, comprising:
    a single amplifying optical fiber doped with erbium, wherein the fiber has a length in which an ASE light generated at one end of the fiber has a first wavelength band that is converted into a second wavelength band while the ASE light propagates to another end of the fiber;
    a single pumping light source and an output port both which are connected to one end of the amplifying optical fiber via a multiplexer; and
    means for reflecting which is connected to the other end of the amplifying optical fiber, whereby the amplifying optical fiber emits ASE light containing a first wavelength band and a second wavelength band through the port, wherein the first wavelength band includes 1530 to 1570 nm of wavelength, wherein the second wavelength band includes 1570 to 1610 nm of wavelength, and wherein the ASE light includes a band of 1530 to 1610 nm wavelength.

20. The broadband ASE light source according to claim 19, wherein the amplifying optical fiber is a quartz-based optical fiber doped with erbium, and has a length of 50 m or more.

21. The broadband ASE light source according to claim 19, further comprising:

a distributing member is connected between the first pumping light source and the one end of the amplifying optical fiber and the divided light from the distributing member is connected to said other end of the amplifying optical fiber via another multiplexer.

22. The broadband ASE light source according to claim 19, wherein the means for reflecting is a filter capable of reflecting the ASE light and passing the pumping light through.

23. The broadband ASE light source according to claim 19, wherein the amplifying optical fiber is a fluoride-based optical fiber doped with erbium, and has a length of 50 m or more.

24. The broadband ASE light source according to claim 19, wherein a product of length and erbium weight concentration of the amplifying optical fiber is greater than 15,000 m·ppm.

25. A broadband Amplified Spontaneous Emission (ASE) light source, comprising:

a single amplifying optical fiber doped with erbium, wherein the fiber has a length in which an ASE light generated at one end of the fiber has a first wavelength band that is converted into a second wavelength band while the ASE light propagates to another end of the fiber;

a first pumping light source and an output port both which are connected to one end of the amplifying optical fiber via a multiplexer; and a second pumping light source connected to the other end of the amplifying optical fiber via another multiplexer; and means for reflecting which is connected to the other end of the amplifying optical fiber, whereby the amplifying optical fiber emits ASE light containing a first wavelength band and a second wavelength band through the port, wherein the first wavelength band includes 1530 to 1570 nm of wavelength, wherein the second wavelength band includes 1570 to 1610 nm of wavelength, and wherein the ASE light includes a band of 1530 to 1610 nm wavelength.

26. The broadband ASE light source according to claim 25, wherein both the pumping light sources have wavelength of a 980 nm band, and the input power supplied for the amplifying fiber from the second pumping light source is less than 20% of the input power supplied for the amplifying fiber from the first pumping light source.

* * * * *